US012233919B2

(12) United States Patent
Tamura et al.

(10) Patent No.: US 12,233,919 B2
(45) Date of Patent: Feb. 25, 2025

(54) DISPLAY METHOD AND SYSTEM

(71) Applicant: HONDA MOTOR CO., LTD., Tokyo (JP)

(72) Inventors: Sho Tamura, Wako (JP); Takao Tamura, Wako (JP); Daichi Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 370 days.

(21) Appl. No.: 17/826,203

(22) Filed: May 27, 2022

(65) Prior Publication Data

US 2022/0388533 A1 Dec. 8, 2022

(30) Foreign Application Priority Data

Jun. 3, 2021 (JP) .................................. 2021-093625

(51) Int. Cl.
*B60W 60/00* (2020.01)
*G06V 20/56* (2022.01)
*G06V 20/58* (2022.01)

(52) U.S. Cl.
CPC ........... *B60W 60/005* (2020.02); *G06V 20/58* (2022.01); *G06V 20/588* (2022.01);
(Continued)

(58) Field of Classification Search
CPC ....... B60W 60/005; B60W 2554/4041; B60W 2552/53; B60W 2556/40; B60W 2710/20;
(Continued)

(56) References Cited

U.S. PATENT DOCUMENTS 11,565,713 B2 * 1/2023 Mimura ................ B60W 50/16
2017/0336515 A1 * 11/2017 Hosoya ................. G01C 21/28
(Continued)

FOREIGN PATENT DOCUMENTS

JP 2018-103863 7/2018
JP 2018-154214 10/2018
(Continued)

OTHER PUBLICATIONS

Japanese Office Action for Japanese Patent Application No. 2021-093625 mailed Jan. 31, 2023.

*Primary Examiner* — Yazan A Soofi
(74) *Attorney, Agent, or Firm* — Amin, Turocy & Watson, LLP

(57) ABSTRACT

Provided is a vehicle control device including: a storage device storing a program; and a hardware processor executing the program stored in the storage device to: recognize a surrounding situation of a vehicle; determine whether or not the surrounding situation includes a road division line; control steering and acceleration/deceleration of the vehicle; determine a driving mode of the vehicle as any one of a plurality of driving modes including a first driving mode and a second driving mode; and set, when the vehicle is traveling in the second driving mode, the surrounding situation is determined not to include a road division line, and a preceding vehicle is recognized within a first predetermined distance in a traveling direction of the vehicle, a longer traveling continuation distance in the second driving mode using the map information.

12 Claims, 6 Drawing Sheets

(52) U.S. Cl.
CPC . *B60W 2552/53* (2020.02); *B60W 2554/4041* (2020.02); *B60W 2554/4044* (2020.02); *B60W 2556/40* (2020.02); *B60W 2710/20* (2013.01); *B60W 2720/106* (2013.01)

(58) Field of Classification Search
CPC .... B60W 2554/4044; B60W 2720/106; G06V 20/58; G06V 20/588
USPC .......................................................... 701/23
See application file for complete search history.

(56) References Cited

U.S. PATENT DOCUMENTS

| | | | |
|---|---|---|---|
| 2019/0061808 A1* | 2/2019 | Mizoguchi | G01C 21/26 |
| 2020/0094828 A1* | 3/2020 | Ohmura | B62D 15/0265 |
| 2022/0212690 A1* | 7/2022 | Zheng | B60W 50/14 |

FOREIGN PATENT DOCUMENTS

| | | |
|---|---|---|
| JP | 2019-038396 | 3/2019 |
| JP | 2019-152667 | 9/2019 |

\* cited by examiner

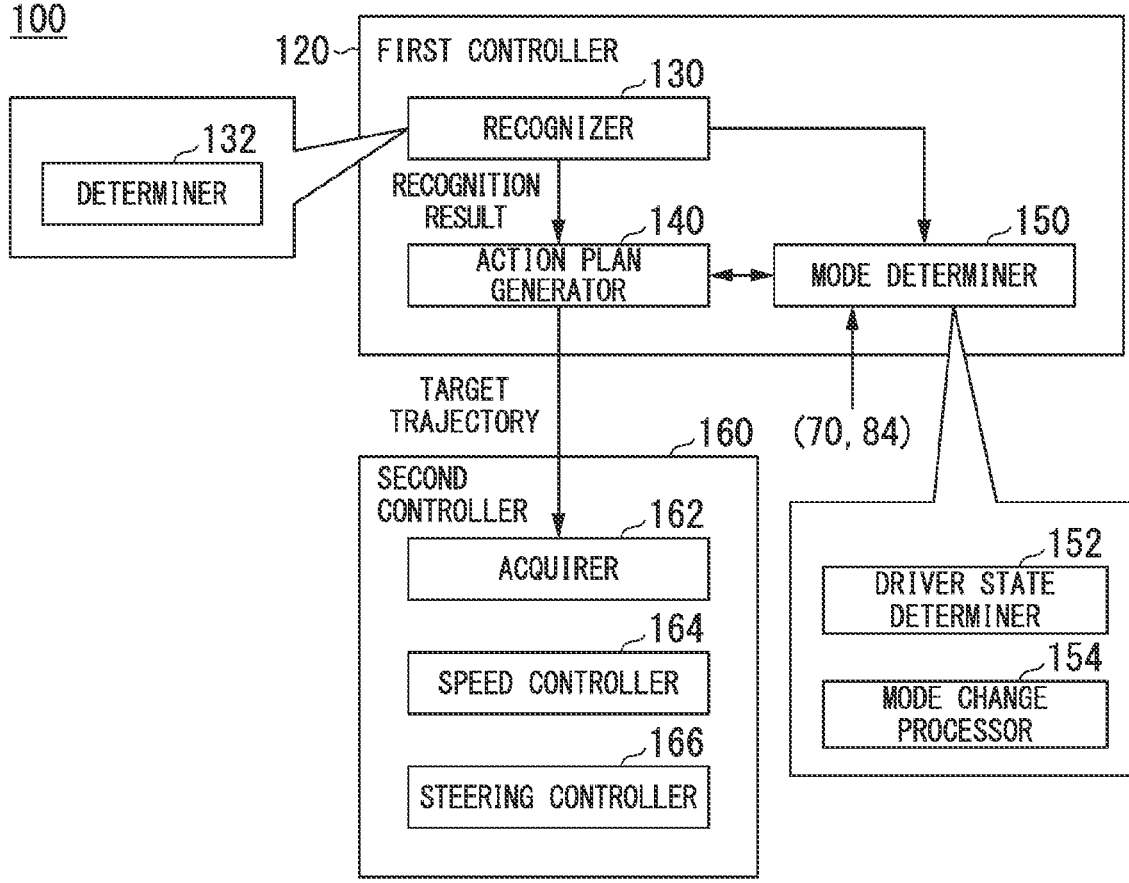

FIG. 5

| LOST PATTERNS OF CAMERA ROAD DIVISION LINE | (a) | (b) | (c) | (d) | (e) |
|---|---|---|---|---|---|
| —— CAMERA ROAD DIVISION LINE<br>------ MAP ROAD DIVISION LINE | | | | | |
| LOST CAMERA ROAD DIVISION LINE | BOTH SIDES | BOTH SIDES | BOTH SIDES | BOTH SIDES | ONE SIDE |
| PRESENCE/ABSENCE OF PRECEDING VEHICLE | PRESENT | PRESENT | PRESENT | ABSENT | — |
| POSITION OF PRECEDING VEHICLE | — | OUTSIDE OF SECOND PREDETERMINED DISTANCE | WITHIN SECOND PREDETERMINED DISTANCE | — | — |

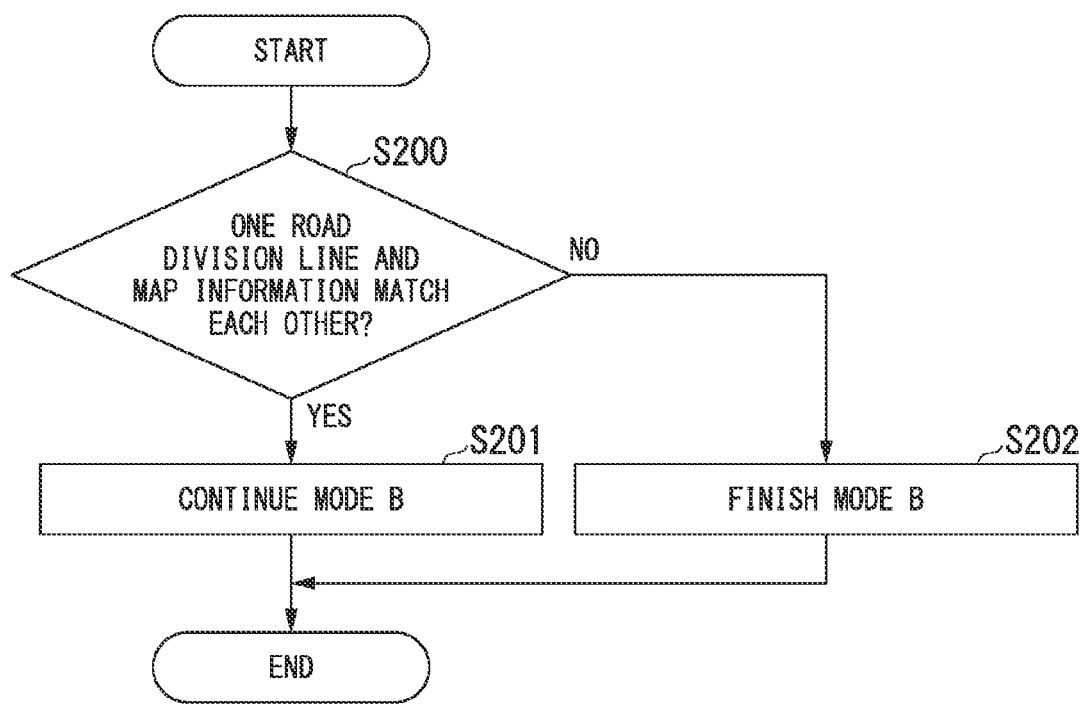

DISPLAY METHOD AND SYSTEM

CROSS-REFERENCE TO RELATED APPLICATION

The application is based on Japanese Patent Application No. 2021-093625 filed on Jun. 3, 2021, the content of which incorporated herein by reference.

BACKGROUND

Field of the Invention

The present invention relates to a vehicle control device, a vehicle control method, and a storage medium.

Description of Related Art

The technology of continuing assistance for driving a host vehicle is known, which is based on other information when the division line of a road in which the host vehicle is traveling cannot be recognized by an in-vehicle camera. For example, Japanese Patent Application Laid-open No. 2018-103863 discloses the technology of performing lane keeping control based on the trajectory of a preceding vehicle when the in-vehicle camera cannot recognize a road division line ahead in the traveling direction of the host vehicle.

SUMMARY

More specifically, the technology of Japanese Patent Application Laid-open No. 2018-103863 performs lane keeping control by setting a corrected trajectory, which is obtained by correcting the trajectory of a preceding vehicle, as a target traveling line. However, in the related art, when the in-vehicle camera cannot recognize the road division line, map information on a lane in which the host vehicle is traveling cannot be used to continue assistance for driving the host vehicle in some cases.

The present invention has been made in view of the above-mentioned circumstances, and has an object to provide a vehicle control device, a vehicle control method, and a storage medium, which are capable of continuing assistance for driving a host vehicle by using map information even when a road division line cannot be recognized.

A vehicle control device, a vehicle control method, and a program according to the present invention adopts the following configuration.

(1): A vehicle control device according to one aspect of the present invention includes: a storage device storing a program; and a hardware processor executing the program stored in the storage device to: recognize a surrounding situation of a vehicle; determine whether or not the surrounding situation includes a road division line; control steering and acceleration/deceleration of the vehicle based on the recognized surrounding situation and map information without depending on an operation performed by a driver of the vehicle; determine a driving mode of the vehicle as any one of a plurality of driving modes including a first driving mode and a second driving mode, wherein the second driving mode is a driving mode in which a load of a task imposed on the driver is smaller than a load of a task imposed in the first driving mode, wherein a part of the plurality of driving modes including at least the second driving mode is performed by controlling steering and acceleration/deceleration of the vehicle without depending on an operation performed by the driver of the vehicle, and wherein when a task in the determined driving mode is not performed by the driver, the driving mode of the vehicle is changed to a driving mode imposing a larger task load; and set, when the vehicle is traveling in the second driving mode, the surrounding situation is determined not to include a road division line, and a preceding vehicle is recognized within a first predetermined distance in a traveling direction of the vehicle, a longer traveling continuation distance in the second driving mode using the map information than when the surrounding situation is determined not to include a road division line, and the preceding vehicle is not recognized.

(2) In the aspect (1), the hardware processor compares the map information with the surrounding situation, and determines whether or not the surrounding situation includes a road division line when the map information does not match the surrounding situation.

(3): In the aspect (1), when the surrounding situation is determined not to include a road division line, the hardware processor determines whether both of the road division lines of the vehicle are not included or only one of the road division lines of the vehicle is not included.

(4): In the aspect (3), when both of the road division lines of the vehicle are determined not to be included, the preceding vehicle is recognized within the first predetermined distance in the traveling direction of the vehicle, and a degree of parallelism between a road division line in the map information and a trajectory of the preceding vehicle is equal to or smaller than a threshold value, the hardware processor sets a longer traveling continuation distance in the second driving mode using the map information than when the degree of parallelism is larger than the threshold value.

(5): In the aspect (3), when both of the road division lines of the vehicle are determined not to be included, the preceding vehicle is recognized within the first predetermined distance in the traveling direction of the vehicle, and a road division line in the map information and a trajectory of the preceding vehicle do not intersect each other, the hardware processor sets a longer traveling continuation distance in the second driving mode using the map information than when the road division line and the trajectory intersect each other.

(6): In the aspect (3), when both of the road division lines of the vehicle are determined not to be included, the preceding vehicle is recognized within the first predetermined distance in the traveling direction of the vehicle, a degree of parallelism between a road division line in the map information and a trajectory of the preceding vehicle is equal to or smaller than a threshold value, and the road division line and the trajectory do not intersect each other, the hardware processor sets a longer traveling continuation distance in the second driving mode using the map information than when the degree of parallelism is larger than the threshold value or the road division line and the trajectory intersect each other.

(7): In the aspect (3), when both of the road division lines of the vehicle are determined not to be included, the preceding vehicle is recognized within the first predetermined distance in the traveling direction of the vehicle, a degree of parallelism between a road division line in the map information and a trajectory of the preceding vehicle is equal to or smaller than a threshold value, and the road division line and the trajectory do not intersect each other, the hardware processor continues traveling of the vehicle in the second driving mode using the map information.

(8): In the aspect (3), both of the road division lines of the vehicle are determined not to be included, the preceding vehicle is recognized within the first predetermined distance in the traveling direction of the vehicle, a degree of parallelism between a road division line in the map information and a trajectory of the preceding vehicle is larger than a threshold value or the road division line and the trajectory intersect each other, and the preceding vehicle is recognized outside of a second predetermined distance in the traveling direction of the vehicle, the hardware processor sets a longer traveling continuation distance in the second driving mode using the map information than when the preceding vehicle is recognized within the second predetermined distance in the traveling direction of the vehicle.

(9): In the aspect (3), when both of the road division lines of the vehicle are determined not to be included, and the preceding vehicle is not recognized within the first predetermined distance in the traveling direction of the vehicle, the hardware processor changes the driving mode from the second driving mode to the first driving mode after causing the vehicle to travel in the second driving mode for a certain distance.

(10): In the aspect (3), when one of the road division lines of the vehicle is determined not to be included, a deviation between a road division line in the map information and the other road division line included in the surrounding situation is determined to be equal to or smaller than a threshold value, and the preceding vehicle is recognized within the first predetermined distance in the traveling direction of the vehicle, the hardware processor continues traveling of the vehicle in the second driving mode.

(11): A vehicle control method to be executed by a computer according to another aspect of the present invention includes: recognizing a surrounding situation of a vehicle; determining whether or not the surrounding situation includes a road division line; controlling steering and acceleration/deceleration of the vehicle based on the recognized surrounding situation and map information without depending on an operation performed by a driver of the vehicle; determining a driving mode of the vehicle as any one of a plurality of driving modes including a first driving mode and a second driving mode, wherein the second driving mode is a driving mode in which a load of a task imposed on the driver is smaller than a load of a task imposed in the first driving mode, wherein a part of the plurality of driving modes including at least the second driving mode is performed by controlling steering and acceleration/deceleration of the vehicle without depending on an operation performed by the driver of the vehicle, and wherein when a task in the determined driving mode is not performed by the driver, the driving mode of the vehicle is changed to a driving mode imposing a larger task load; and setting, when the vehicle is traveling in the second driving mode, the surrounding situation is determined not to include a road division line, and a preceding vehicle is recognized within a first predetermined distance in a traveling direction of the vehicle, a longer traveling continuation distance in the second driving mode using the map information than when the surrounding situation is determined not to include a road division line, and the preceding vehicle is not recognized.

(12): A program according to another aspect of the present invention causes a computer to: recognize a surrounding situation of a vehicle; determine whether or not the surrounding situation includes a road division line; control steering and acceleration/deceleration of the vehicle based on the recognized surrounding situation and map information without depending on an operation performed by a driver of the vehicle; determine a driving mode of the vehicle as any one of a plurality of driving modes including a first driving mode and a second driving mode, wherein the second driving mode is a driving mode in which a load of a task imposed on the driver is smaller than a load of a task imposed in the first driving mode, wherein a part of the plurality of driving modes including at least the second driving mode is performed by controlling steering and acceleration/deceleration of the vehicle without depending on an operation performed by the driver of the vehicle, and wherein when a task in the determined driving mode is not performed by the driver, the driving mode of the vehicle is changed to a driving mode imposing a larger task load; and set, when the vehicle is traveling in the second driving mode, the surrounding situation is determined not to include a road division line, and a preceding vehicle is recognized within a first predetermined distance in a traveling direction of the vehicle, a longer traveling continuation distance in the second driving mode using the map information than when the surrounding situation is determined not to include a road division line, and the preceding vehicle is not recognized.

According to the aspects of (1) to (12), it is possible to continue assistance for driving a host vehicle by using map information even when a road division line cannot be recognized.

BRIEF DESCRIPTION OF THE DRAWINGS

FIG. 2 is a functional configuration diagram of a first controller 120 and a second controller 160.

FIG. 3 is a diagram illustrating an example of a correspondence relationship among a driving mode, the control state of a host vehicle M, and a task.

FIG. 5 is a diagram for describing the pattern of setting a traveling continuation distance in a driving mode of a mode B.

FIG. 7 is a flow chart illustrating an example of a flow of operations to be executed by the vehicle control device when the surrounding situation recognized by the recognizer includes only one road division line.

DESCRIPTION OF EMBODIMENTS

Now, description is given of a vehicle control device, a vehicle control method, and a program according to an embodiment of the present invention with reference to the drawings.

[Overall Configuration]

Figure 1:
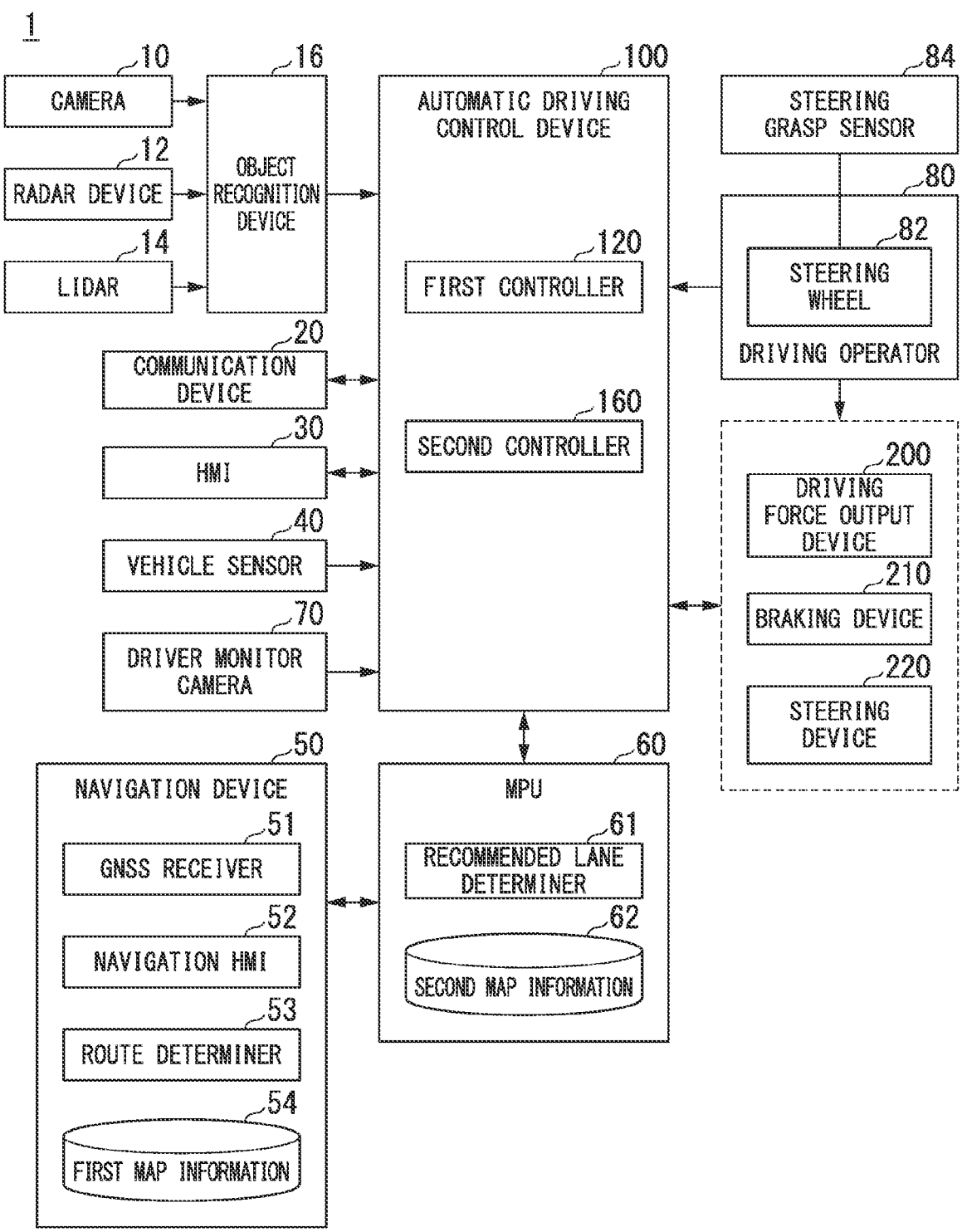
FIG. 1 is a configuration diagram of a vehicle system 1 using a vehicle control device according to an embodiment.

FIG. 1 is a configuration diagram of a vehicle system 1 that uses a vehicle control device according to an embodiment. A vehicle including the vehicle system 1 is, for example, a vehicle such as a two-wheeled vehicle, a three-wheeled vehicle, or a four-wheeled vehicle, and its power source is an internal combustion engine such as a diesel engine or a gasoline engine, an electric motor, or a combination thereof. The electric motor operates by using power generated by a generator connected to the internal combustion engine or power discharged by a secondary battery or a fuel cell.

The vehicle system 1 includes, for example, a camera 10, a radar device 12, a LIDAR (Light Detection and Ranging) device 14, an object recognition device 16, a communication device 20, an HMI (Human Machine Interface) 30, a vehicle sensor 40, a navigation device 50, an MPU (Map Positioning Unit) 60, a driver monitoring camera 70, a driving operator 80, an automatic driving control device 100, a driving force output device 200, a braking device 210, and a steering device 220. These devices and instruments are connected to one another via, for example, a wireless communication line, a serial communication line, or a multiplex communication line such as a CAN (Controller Area Network) communication line. The configuration illustrated in FIG. 1 is only one example, and a part of the configuration may be omitted, or another configuration may be added.

The camera 10 is, for example, a digital camera that uses a solid image pickup device such as a CCD (Charge Coupled Device) or a CMOS (Complementary Metal Oxide Semiconductor). The camera 10 is mounted on any part of a vehicle (hereinafter referred to as "host vehicle M") including the vehicle system 1. When the camera 10 picks up a front image, the camera 10 is mounted on, for example, an upper part of a front windshield or a back surface of a rear-view mirror. The camera 10 repeatedly photographs the surroundings of the host vehicle M periodically, for example. The camera 10 may be a stereo camera.

The radar device 12 radiates a radio wave such as a millimeter wave toward the surroundings of the host vehicle M, and detects a radio wave (reflected wave) reflected by an object, to detect at least the position (distance and direction) of the object. The radar device 12 is mounted on any part of the host vehicle M. The radar device 12 may detect the position and speed of the object by an FM-CW (Frequency Modulated Continuous Wave) method.

The LIDAR 14 radiates light (or electromagnetic wave having a wavelength close to light) toward the surroundings of the host vehicle M, and measures diffused light. The LIDAR 14 detects a distance to a target based on a period of time since emission of light until reception of light. The light to be radiated is, for example, pulsed laser light. The LIDAR 14 is mounted on any part of the host vehicle M.

The object recognition device 16 executes sensor fusion processing for results of detection by a part or all of the camera 10, the radar device 12, and the LIDAR 14, to thereby recognize a position, a type, and a speed of an object, for example. The object recognition device 16 outputs the recognition result to the automatic driving control device 100. The object recognition device 16 may output the results of detection by the camera 10, the radar device 12, and the LIDAR 14 to the automatic driving control device 100 as they are. The object recognition device 16 may be omitted from the vehicle system 1.

The communication device 20 uses, for example, a cellular network, a Wi-Fi network, Bluetooth (trademark), or DSRC (Dedicated Short Range Communication) to communicate with another vehicle existing near the host vehicle M or communicate with various kinds of server devices via a radio base station.

The HMI 30 presents various kinds of information to an occupant of the host vehicle M, and receives input of an operation by the occupant. The HMI 30 includes, for example, various kinds of display devices, speakers, buzzers, touch panels, switches, and keys.

The vehicle sensor 40 includes, for example, a vehicle speed sensor that detects a speed of the host vehicle M, an acceleration sensor that detects an acceleration, a yaw rate sensor that detects an angular speed with respect to a vertical axis, and an orientation sensor that detects an orientation of the host vehicle M.

The navigation device 50 includes, for example, a GNSS (Global Navigation Satellite System) receiver 51, a navigation HMI 52, and a route determiner 53. The navigation device 50 holds first map information 54 in a storage device such as an HDD (Hard Disk Drive) or a flash memory. The GNSS receiver 51 identifies the position of the host vehicle M based on a signal received from a GNSS satellite. The position of the host vehicle M may be identified or complemented by an INS (Inertial Navigation System) that uses output of the vehicle sensor 40. The navigation HMI 52 includes, for example, a display device, a speaker, a touch panel, and a key. The navigation HMI 52 and the HMI 30 described above may be integrated partially or completely. The route determiner 53 refers to the first map information 54 to determine a route (hereinafter referred to as "map route") from the position (or any input position) of the host vehicle M identified by the GNSS receiver 51 to a destination input by an occupant by using the navigation HMI 52, for example. The first map information 54 is, for example, information representing road structure by a link indicating a road and nodes connected by the link. The first map information 54 may include, for example, a curvature of a road and POI (Point Of Interest) information. The map route is output to the MPU 60. The navigation device 50 may guide a route by using the navigation HMI 52 based on the map route. The navigation device 50 may be implemented by, for example, the function of a terminal device such as a smartphone or a tablet terminal held by the occupant. The navigation device 50 may transmit the current position and the destination to a navigation server via the communication device 20, and acquire a route similar to the map route from the navigation server.

The MPU 60 includes, for example, a recommended lane determiner 61, and holds second map information 62 in a storage device such as an HDD or a flash memory. The recommended lane determiner 61 divides the map route provided by the navigation device 50 into a plurality of blocks (for example, at intervals of 100 [m] with respect to a vehicle travel direction), and determines a recommended route for each block with reference to the second map information 62. The recommended lane determiner 61 determines on which lane the host vehicle M is to travel. When there is a junction on a map route, the recommended lane determiner 61 determines a recommended route so that the host vehicle M can travel on a route for efficiently entering the junction.

The second map information 62 is map information having higher precision than that of the first map information 54. The second map information 62 includes, for example, information on the center of a lane or information on the boundary of a lane. The second map information 62 may include, for example, road information, traffic regulation information, address information (address or postal code), facility information, and phone number information. The second map information 62 may be updated appropriately through communication between the communication device 20 and another device.

A driver monitor camera 70 is, for example, a digital camera that uses a solid image pickup device such as a CCD or a CMOS. The driver monitor camera 70 is mounted on any part of the host vehicle M at a position and in a direction so as to be capable of picking up a front image of a head of an occupant (hereinafter referred to as "driver") sitting on a driver seat of the host vehicle M (in the direction of picking up an image of the face). For example, the driver monitor camera 70 is mounted on an upper part of a display device provided on the center of an instrumental panel of the host vehicle M.

The driving operator 80 includes, for example, an acceleration pedal, a brake pedal, a gear shift, and other operators in addition to the steering wheel 82. A sensor that detects an operation amount or whether an operation is applied is mounted on the driving operator 80, and the detection result is output to the automatic driving control device 100 or a part or all of the driving force output device 200, the braking device 210, and the steering device 220. The steering wheel 82 is an example of an "operator that receives a steering operation performed by a driver". The operator is not always required to have a ring shape, and may have other shapes for steering, or may be a joystick or a button. A steering grasp sensor 84 is attached to the steering wheel 82. The steering grasp sensor 84 is implemented by, for example, a capacitive sensor, and outputs, to the automatic driving control device 100, a signal that enables detection of whether or not the driver is grasping the steering wheel 82 (in contact with the steering wheel 82 so as to be able to apply a force).

The automatic driving control device 100 includes, for example, a first controller 120 and a second controller 160. The first controller 120 and the second controller 160 are each implemented by a hardware processor such as a CPU (Central Processing Unit) executing a program (software). A part or all of the components may be implemented by hardware (circuit; including circuitry) such as an LSI (Large Scale Integration), an ASIC (Application Specific Integrated Circuit), an FPGA (Field-Programmable Gate Array), or a GPU (Graphics Processing Unit), or may be implemented by cooperation between software and hardware. The program may be stored in advance in a storage device (storage device including a non-transitory storage medium) of the automatic driving control device 100 such as an HDD or a flash memory, or the program may be stored in a removable storage medium such as a DVD or a CD-ROM. Then, the storage medium (non-transitory storage medium) may be mounted on a drive device so that the program is installed into an HDD or a flash memory of the automatic driving control device 100. The automatic driving control device 100 is an example of "vehicle control device", and a combination of an action plan generator 140 and a second controller 160 is an example of "drive controller".

FIG. 2 is a functional configuration diagram of the first controller 120 and the second controller 160. The first controller 120 includes, for example, a recognizer 130, an action plan generator 140, and a mode determiner 150. The first controller 120 implements, for example, the function of AI (Artificial Intelligence) and the function of a model given in advance in parallel. For example, the function of "recognizing an intersection" may be implemented by executing recognition of an intersection by, for example, deep learning, and recognition based on a condition (including, for example, a signal adapted for pattern matching and a road sign) given in advance in parallel, giving scores to both of the recognitions, and giving an integrated evaluation.

The recognizer 130 recognizes states such as the position, speed, and acceleration of an object near the host vehicle M based on information input from the camera 10, the radar device 12, and the LIDAR 14 via the object recognition device 16. The position of an object is, for example, recognized as a position in an absolute coordinate system with respect to a representative point (for example, center of gravity or center of drive axis) of the host vehicle M to be used for control. The position of an object may be represented by a representative point such as a center of gravity or corner of the object, or may be represented by a region. The "state" of an object may include the acceleration, jerk, or "action state" (for example, whether or not the host vehicle M is changing a lane or is trying to change a lane) of the object.

The recognizer 130 recognizes, for example, a lane (traveling lane) on which the host vehicle M is traveling. For example, the recognizer 130 recognizes the traveling lane by comparing a pattern (for example, arrangement of solid lines and broken lines) of a road division line obtained from the second map information 62 with a pattern of a road division line near the host vehicle M recognized from the image photographed by the camera 10, to thereby recognize the traveling lane. In addition to the road division line, the recognizer 130 may recognize the traveling lane by recognizing a traveling path boundary (road boundary) including, for example, a road division line, the shoulder of a road, a curb, a center median, and a guardrail. The traveling lane may be recognized in consideration of the position of the host vehicle M acquired from the navigation device 50 or the result of processing by the INS. The recognizer 130 recognizes a stop line, an obstacle, red light, a toll gate, and other road events.

The recognizer 130 recognizes the position or posture of the host vehicle M with respect to a traveling lane when recognizing the traveling lane. The recognizer 130 may recognize, for example, as the relative position and posture of the host vehicle M with respect to the traveling lane, a deviation of the reference point of the host vehicle M from the center of the lane and an angle with respect to a line obtained by connecting the centers of the lane in the traveling direction of the host vehicle M. Instead, the recognizer 130 may recognize, for example, the position of the reference point of the host vehicle M with respect to any side edge (road division line or road boundary) of the traveling lane as the relative position of the host vehicle M with respect to the traveling lane. The recognizer 130 includes a determiner 132, which is described later in detail.

The action plan generator 140 travels on a recommended lane determined by the recommended lane determiner 61 in principle, and generates a target trajectory in which the host vehicle M is to travel in the future (irrespective of the operation of the driver) automatically so as to be capable of coping with the surrounding situation of the host vehicle M. The target trajectory includes, for example, a speed component. For example, the target trajectory is represented by arranging the locations (trajectory points) to be reached by the host vehicle M. The trajectory points are locations to be reached by the host vehicle M at predetermined travelled distances (for example, about several meters) along the road. In addition, a target speed and a target acceleration are generated in each predetermined sampling period (for example, less than 1 second) as a part of the target trajectory. The trajectory points may be positions to be reached by the host vehicle M in each sampling period. In this case, information on the target speed and the target acceleration is represented by an interval between trajectory points.

The action plan generator 140 may set an automatic driving event when generating a target trajectory. The automatic driving event includes, for example, a constant speed traveling event, a low-speed following traveling event, a lane change event, a junction event, a merge event, and a takeover event. The action plan generator 140 generates a target trajectory that depends on an activated event.

The mode determiner 150 determines a driving mode of the host vehicle M as any one of a plurality of driving modes having different tasks imposed on a driver. The mode determiner 150 includes, for example, a driver state determiner 152 and a mode change processor 154. The functions of these components are described later.

FIG. 3 is a diagram illustrating an example of a correspondence relationship among a driving mode, a control state of the host vehicle M, and a task. The driving mode of the host vehicle M includes, for example, five modes, namely, a mode A to a mode E. The control state, namely, the degree of automatic driving control of the host vehicle M is the highest for the mode A, and the degree of automatic driving control decreases in order of the mode B, the mode C, the mode D, and the mode E. In contrast, the degree of a task imposed on a driver is the smallest for the mode A, and increases in order of the mode B, the mode C, the mode D, and the mode E. The mode D or the mode E is a control state that is not automatic driving, and thus the automatic driving control device 100 has a responsibility to finish control relating to automatic driving, and cause the driving mode to transition to driving assistance or manual driving. Now, examples of details of the respective driving modes are given in the following.

The mode A relates to the state of automatic driving, and the driver does not bear any one of the tasks of monitoring the front field of view and grasping the steering wheel 82. However, even in the mode A, the driver is required to have a posture of being able to immediately transition to manual driving in response to a request from a system, which is mainly the automatic driving control device 100. The automatic driving indicates that both of steering and acceleration/deceleration are controlled irrespective of an operation of the driver. The front field of view means a space in the traveling direction of the host vehicle M visually recognized through a front wind shield. The mode A is a driving mode that can be executed, for example, when the host vehicle M is traveling at a speed equal to or lower than the upper limit vehicle speed (for example, about 50 [km/h]) on an expressway such as a highway, and there is a preceding vehicle for the host vehicle M to follow, which is sometimes referred to as TJP (Traffic Jam Pilot). When this condition is not satisfied, the mode determiner 150 changes the driving mode of the host vehicle M to the mode B.

The mode B relates to the state of driving assistance, and the driver bears the task of monitoring the front field of view of the host vehicle M, but does not have the task of grasping the steering wheel 82. In particular, the mode B is executed when the host vehicle M is traveling at a speed equal to or higher than the upper limit vehicle speed at which the above-mentioned TJP is executed. The mode C relates to the state of driving assistance, and the driver bears the task of monitoring the front field of view, and the task of grasping the steering wheel 82. The mode D is a driving mode in which the driver is required to perform a certain degree of operation for at least one of steering and acceleration/deceleration of the host vehicle M. For example, in the mode D, driving assistance such as ACC (Adaptive Cruise Control) or LKAS (Lane Keeping Assist System) is performed. The mode E refers to the state of manual driving in which the driver is required to perform a driving operation for both of steering and acceleration/deceleration. In both of the mode D and the mode E, the driver naturally bears the task of monitoring the front field of view of the host vehicle M.

The automatic driving control device 100 (and driving assistance device (not shown)) executes automatic lane change that depends on the driving mode. The automatic lane change includes an automatic lane change (1) required by the system and an automatic lane change (2) required by the driver. The automatic lane change (1) includes an automatic lane change for passing a preceding vehicle, which is performed when the vehicle speed of the preceding vehicle is lower than the vehicle speed of the own vehicle by a reference amount or more, and an automatic lane change (automatic lane change caused by change of recommended lane) for traveling toward the destination. The automatic lane change (2) is to change the lane of the host vehicle M toward an operation direction when the driver has operated a blinker in a case where, for example, a condition on the vehicle speed or a positional relationship with a nearby vehicle is satisfied.

In the mode A, the automatic driving control device 100 does not execute any one of the automatic lane change (1) and the automatic lane change (2). In the mode B and the mode C, the automatic driving control device 100 executes both of the automatic lane change (1) and the automatic lane change (2). In the mode D, the driving assistance device (not shown) does not execute the automatic lane change (1) but executes the automatic lane change (2). In the mode E, both of the automatic lane change (1) and the automatic lane change (2) are not executed.

When the task of the determined driving mode (hereinafter referred to as "current driving mode") is not performed by the driver, the mode determiner 150 changes the driving mode of the host vehicle M to a driving mode that imposes a heavier task.

For example, when the driver is in a posture of not being able to transition to manual driving in response to a request from the system in the mode A (for example, when the driver is continuously looking aside or when a sign that indicates a difficulty in driving is detected), the mode determiner 150 uses the HMI 30 to prompt the driver to transition to manual driving, and when the driver does not respond, the mode determiner 150 performs control of causing the host vehicle M to gradually stop at the shoulder of the road and stopping automatic driving. After automatic driving is stopped, the host vehicle M is set to the state of the mode D or the mode E, and the host vehicle M can be caused to start by a manual operation performed by the driver. The following description holds true for the case of "stopping automatic driving". The following description holds true for the case of "stopping automatic driving". When the driver is not monitoring the front field of view in the mode B, the mode determiner 150 uses the HMI 30 to prompt the driver to monitor the front field of view, and when the driver does not respond, the mode determiner 150 performs control of causing the host vehicle M to gradually stop at the shoulder of the road and stopping automatic driving. When the driver is not monitoring the front field of view or is not grasping the steering wheel 82 in the mode C, the mode determiner 150 uses the HMI 30 to prompt the driver to monitor the front field of view and/or to grasp the steering wheel 82, and when the driver does not respond, the mode determiner 150 performs control of causing the host vehicle M to gradually stop at the shoulder of the road and stopping automatic driving.

The driver state determiner 152 monitors the state of the driver and determines whether the state of the driver is a state that depends on a task in order to perform the mode change described above. For example, the driver state determiner 152 analyzes an image photographed by the driver monitor camera 70 to perform posture estimation processing, and determines whether the driver is in a posture of not being able to transition to manual driving in response to a request from the system. The driver state determiner 152 analyzes the image photographed by the driver monitor camera 70 to perform line-of-sight estimation processing, and determines whether or not the driver is monitoring the front field of view.

The mode change processor 154 performs various kinds of processing for changing the mode. For example, the mode change processor 154 instructs the action plan generator 140 to generate a target trajectory for stopping at the shoulder, gives an activation instruction to the driving assistance device (not shown), or controls the HMI 30 to cause the driver to perform an action.

The second controller 160 controls the driving force output device 200, the braking device 210, and the steering device 220 so that the host vehicle M passes through the target trajectory generated by the action plan generator 140 as scheduled.

Referring back to FIG. 2, the second controller 160 includes, for example, an acquirer 162, a speed controller 164, and a steering controller 166. The acquirer 162 acquires information on a target trajectory (trajectory points) generated by the action plan generator 140, and stores the information into a memory (not shown). The speed controller 164 controls the driving force output device 200 or the braking device 210 based on a speed component accompanying the target trajectory stored in the memory. The steering controller 166 controls the steering device 220 depending on the degree of curve of the target trajectory stored in the memory. The processing of the speed controller 164 and the steering controller 166 is implemented by a combination of feed-forward control and feedback control. As an example, the steering controller 166 executes feed-forward control that depends on the curvature of the road in front of the host vehicle M and feedback control based on a deviation from the target trajectory.

The driving force output device 200 outputs, to a drive wheel, a traveling driving force (torque) for causing the host vehicle M to travel. The driving force output device 200 includes, for example, a combination of an internal combustion engine, an electric motor, and a transmission, and an ECU (Electronic Control Unit) configured to control these components. The ECU controls the above-mentioned components in accordance with information input from the second controller 160 or information input from the driving operator 80.

The braking device 210 includes, for example, a brake caliper, a cylinder that transmits a hydraulic pressure to the brake caliper, an electric motor that causes the hydraulic pressure in the cylinder, and a brake ECU. The brake ECU controls the electric motor in accordance with information input from the second controller 160 or information input from the driving operator 80, and causes a brake torque that depends on a braking operation to be output to each wheel. The braking device 210 may include, as a backup, a mechanism for transmitting the hydraulic pressure, which is caused by an operation of the brake pedal included in the driving operator 80, to the cylinder via a master cylinder. The configuration of the braking device 210 is not limited to the configuration described above, and the braking device 210 may be an electronic hydraulic brake device configured to control an actuator in accordance with information input from the second controller 160, and transmit the hydraulic pressure of the master cylinder to the cylinder.

The steering device 220 includes, for example, a steering ECU and an electric motor. The electric motor causes a force in a rack-and-pinion mechanism to change the orientation of a steered wheel. The steering ECU drives the electric motor in accordance with information input from the second controller 160 or information input from the driving operator 80 to change the orientation of the steered wheel.

[Operation]

Figure 4:
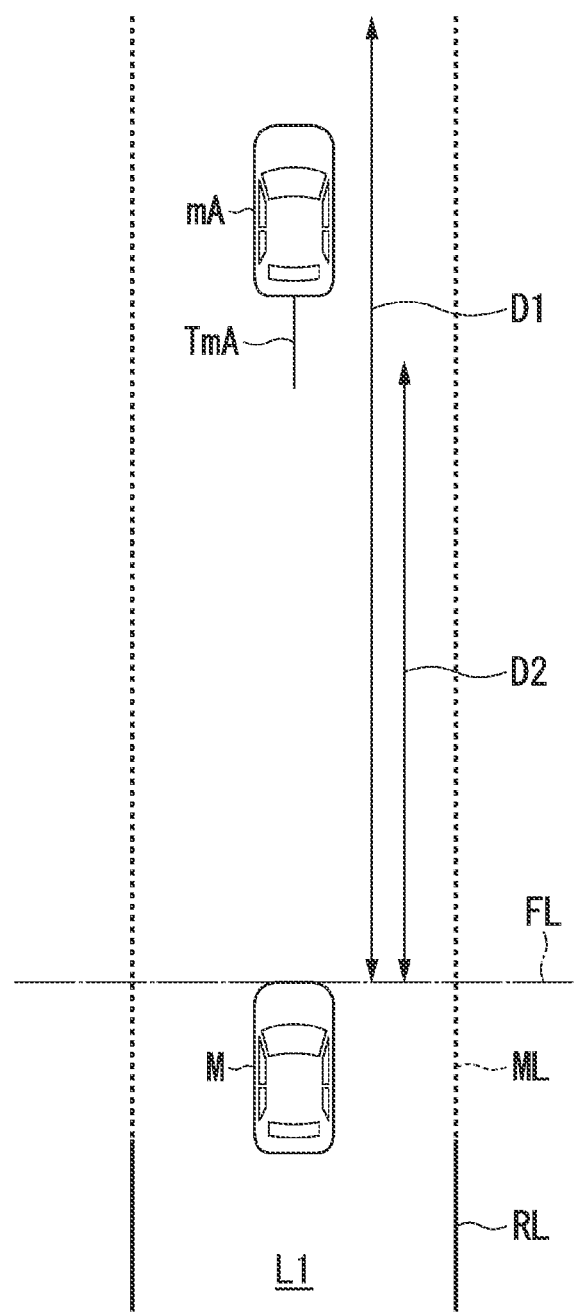
FIG. 4 is a diagram illustrating an example of a scene in which the operation of the vehicle control device according to an embodiment is executed.

Next, description is given of an operation of a vehicle control device according to an embodiment. In the following description, it is assumed that the host vehicle M is traveling in the driving mode of the mode B. FIG. 4 is a diagram illustrating an example of a scene in which the operation of the vehicle control device according to an embodiment is executed. In FIG. 4, the host vehicle M is traveling on a lane L1, and a preceding vehicle mA is traveling in front of the host vehicle M. While the host vehicle M is traveling on the lane L1, the recognizer 130 tries to recognize the surrounding situation of the host vehicle M, in particular, tries to recognize road division lines on both sides of the host vehicle M. RL represents a road division line photographed by the camera 10 and recognized by the recognizer 130, ML represents road division line information in the second map information 62, and TmA represents the trajectory of the preceding vehicle mA recognized by the recognizer 130. In this embodiment, it is assumed that the recognizer 130 recognizes the trajectory TmA of the center of the back end of the preceding vehicle mA photographed by the camera 10. However, the present invention is not limited to such a configuration, and for example, the recognizer 130 may recognize the trajectory TmA with the center of gravity of the preceding vehicle mA serving as a reference.

The determiner 132 determines whether or not the surrounding situation recognized by the recognizer 130 includes a road division line. More specifically, the determiner 132 compares the second map information 62 with the surrounding situation recognized by the recognizer 130, and when the second map information 62 and the surrounding situation do not match each other, determines whether or not the surrounding situation includes a road division line. For example, the determiner 132 can determine that the surrounding situation does not include a road division line when the recognizer 130 cannot acquire image pickup data of the surrounding situation from the camera 10. Further, for example, the determiner 132 can determine that the surrounding situation does not include a road division line by comparing the road division line indicated by the second map information 62 with the surrounding situation recognized by the recognizer 130.

When the determiner 132 has determined that the surrounding situation recognized by the recognizer 130 does not include a road division line, the determiner 132 determines whether the surrounding situation does not include road division lines on both sides of the host vehicle M, or does not include only the road division line on one side of the host vehicle M. In the case of FIG. 4, while the host vehicle M is traveling on the lane L1, the recognizer 130 has recognized road division lines RL on both sides, and after that, the determiner 132 determines that road division lines on both sides are not included due to disconnection of the road division line RL.

[Setting of Traveling Continuation Distance]

When the host vehicle M is traveling in the driving mode of the mode B and the determiner 132 has determined that the surrounding situation does not include a road division line, the action plan generator 140 determines a traveling continuation distance in the driving mode of the mode B using the second map information 62 in accordance with a plurality of patterns described later, and generates a target trajectory that depends on the traveling continuation distance. In other words, the action plan generator 140 cannot use road division line information included in the surrounding situation recognized by the recognizer 130, and thus uses road division line information in the second map information 62 to continue the driving mode of the mode B and generate a target trajectory. At this time, in particular, when the determiner 132 has determined that the surrounding situation does not include a road division line and the recognizer 130 has recognized the preceding vehicle mA within a first predetermined distance D1 in the traveling direction of the host vehicle M, the action plan generator 140 sets a longer traveling continuation distance in the driving mode of the mode B using the second map information 62 than when the surrounding situation is determined not to include a road division line and the preceding vehicle is not recognized. As indicated in FIG. 4, the first predetermined distance D1 means a distance in the traveling direction of the host vehicle M with reference to a straight line FL (indicated by dashed line) parallel to the front end of the host vehicle M, which is the longest distance that enables the host vehicle M to follow the preceding vehicle mA. Now, description is given in detail of the pattern of setting the traveling continuation distance in the driving mode of the mode B with reference to FIG. 5.

FIG. 5 is a diagram for describing the pattern of setting a traveling continuation distance in the driving mode of the mode B. As illustrated in FIG. 5, the pattern of setting the traveling continuation distance is classified into the following five patterns.

[Pattern (a)]

In the pattern (a) of FIG. 5, when both of the road division lines of the host vehicle M are determined not to be included, the preceding vehicle mA is recognized within the first predetermined distance D1 in the traveling direction of the host vehicle M, a degree of parallelism between the road division line ML in the map information 62 and the trajectory TmA of the preceding vehicle mA is equal to or smaller than a threshold value, and the road division line ML and the trajectory TmA do not intersect each other, the action plan generator 140 sets a longer traveling continuation distance in the driving mode of the mode B using the second map information 62 than when the degree of parallelism is larger than the threshold value or the road division line ML and the trajectory TmA intersect each other. This is because when the degree of parallelism between the road division line ML in the second map information 62 and the trajectory TmA of the preceding vehicle mA is equal to or smaller than the threshold value and the road division line ML and the trajectory TmA do not intersect each other, this means that the preceding vehicle mA is likely to travel on the inner side of the road division line ML and travel along the direction of the road division line ML. Thus, the action plan generator 140 generates a target trajectory based on the road division line ML in the second map information 62 and the trajectory TmA of the preceding vehicle mA, and continues traveling of the host vehicle M in the driving mode of the mode B. For example, the action plan generator 140 may generate a target trajectory so that the host vehicle M follows the preceding vehicle mA and travels along the road division line ML in the second map information 62. The host vehicle M continues to travel in the driving mode of the mode B using the second map information 62 as long as the condition of the pattern (a) is satisfied.

In the pattern (a), the determiner 132 determines whether or not the degree of parallelism between the road division line ML in the second map information 62 and the trajectory TmA of the preceding vehicle mA is equal to or smaller than the threshold value and the road division line ML and the trajectory TmA intersect each other. However, the present invention is not limited to such a configuration, and the determiner 132 may determine whether or not the degree of parallelism between the road division line ML in the second map information 62 and the trajectory TmA of the preceding vehicle mA is equal to or smaller than the threshold value, or whether or not the road division line ML and the trajectory TmA intersect each other. Then, when the degree of parallelism between the road division line ML in the second map information 62 and the trajectory TmA of the preceding vehicle mA is equal to or smaller than the threshold value, the action plan generator 140 may set a longer traveling continuation distance in the driving mode of the mode B using the second map information 62 than when the degree of parallelism is not equal to or smaller than the threshold value. Similarly, when the road division line ML in the second map information 62 and the trajectory TmA of the preceding vehicle mA do not intersect each other, the action plan generator 140 may set a longer traveling continuation distance in the driving mode of the mode B using the second map information 62 than when the road division line ML in the second map information 62 and the trajectory TmA of the preceding vehicle mA intersect each other.

Furthermore, in this embodiment, the determiner 132 executes determination relating to the degree of parallelism and intersection by using the past trajectory TmA of the preceding vehicle mA. However, the present invention is not limited to such a configuration, and for example, the determiner 132 may execute determination relating to the degree of parallelism and intersection by estimating the future trajectory of the preceding vehicle mA based on information such as the past trajectory, speed, and acceleration of the preceding vehicle mA recognized by the recognizer 130, and comparing the estimated future trajectory with the road division line ML in the second map information 62. In this case, the trajectory may be estimated based on a tangent line passing through the current position in the past trajectory of the preceding vehicle mA, or by fitting using a curve such as a circular arc. Even in a case where the trajectory TmA and the road division line ML do not intersect each other, the determiner 132 may determine that the trajectory TmA and the road division line ML intersect each other when the recognizer 130 has recognized that the preceding vehicle mA itself and the road division line ML are in contact with each other.

[Patterns (b) and (c)]

In the patterns (b) and (c) of FIG. 5, when both of the road division lines of the host vehicle M are determined not to be included, the preceding vehicle is recognized within the first predetermined distance D1 in the traveling direction of the host vehicle M, the degree of parallelism between the road division line ML in the second map information 62 and the trajectory TmA of the preceding vehicle mA is larger than the threshold value or the road division line ML and the trajectory TmA intersect each other, and the preceding vehicle mA is recognized outside of a second predetermined distance D2 in the traveling direction of the host vehicle M, the action plan generator 140 sets a longer traveling continuation distance in the driving mode of the mode B using the second map information 62 than when the preceding vehicle mA is recognized within the second predetermined distance D2 in the traveling direction of the host vehicle M. As indicated in FIG. 4, the second predetermined distance D2 means a distance shorter than the first predetermined distance D1 in the traveling direction of the host vehicle M with reference to the straight line FL, which is an inter-vehicle distance desired to cause the host vehicle M to follow the preceding vehicle mA. The second predetermined distance D2 is, for example, an inter-vehicle time such as several seconds. When the recognizer 130 has recognized the preceding vehicle mA outside of the second predetermined distance D2 in the traveling direction of the host vehicle M, the action plan generator 140 can continue traveling in the driving mode of the mode B using the second map information 62 at least for the second predetermined distance D2.

[Pattern (d)]

In the pattern (d) of FIG. 5, when both of the road division lines of the host vehicle M are determined not to be included, and the preceding vehicle mA is not recognized within the first predetermined distance D1 in the traveling direction of the host vehicle M, the action plan generator 140 causes the host vehicle M to travel in the driving mode of the mode B for a certain distance, and after that, the mode determiner 150 finishes the driving mode of the mode B. At this time, the mode determiner 150 may change the driving mode of the mode B to any one of the mode C, the mode D, and the mode E. The action plan generator 140 can continue traveling in the driving mode of the mode B using the second map information 62 at least as far as the recognizer 130 can recognize both road division lines in the forward traveling direction of the host vehicle M.

[Pattern (e)] In the pattern (e) of FIG. 5, when one of the road division lines of the host vehicle M is determined not to be included, a deviation between the road division line ML in the second map information 62 and the other road division line included in the surrounding situation is determined to be equal to or smaller than a threshold value, and the preceding vehicle mA is recognized within the first predetermined distance D1 in the traveling direction of the host vehicle M, the action plan generator 140 continues traveling of the host vehicle M in the driving mode of the mode B using the second map information 62. That is, the action plan generator 140 generates a target trajectory so that the host vehicle M travels along the road division line ML (=the other road division line included in surrounding situation) in the second map information 62, which is confirmed to be correct by matching. The host vehicle M continues to travel in the driving mode of the mode B using the second map information 62 as long as the condition of the pattern (e) is satisfied.

[Flow of Operations]

Figure 6:
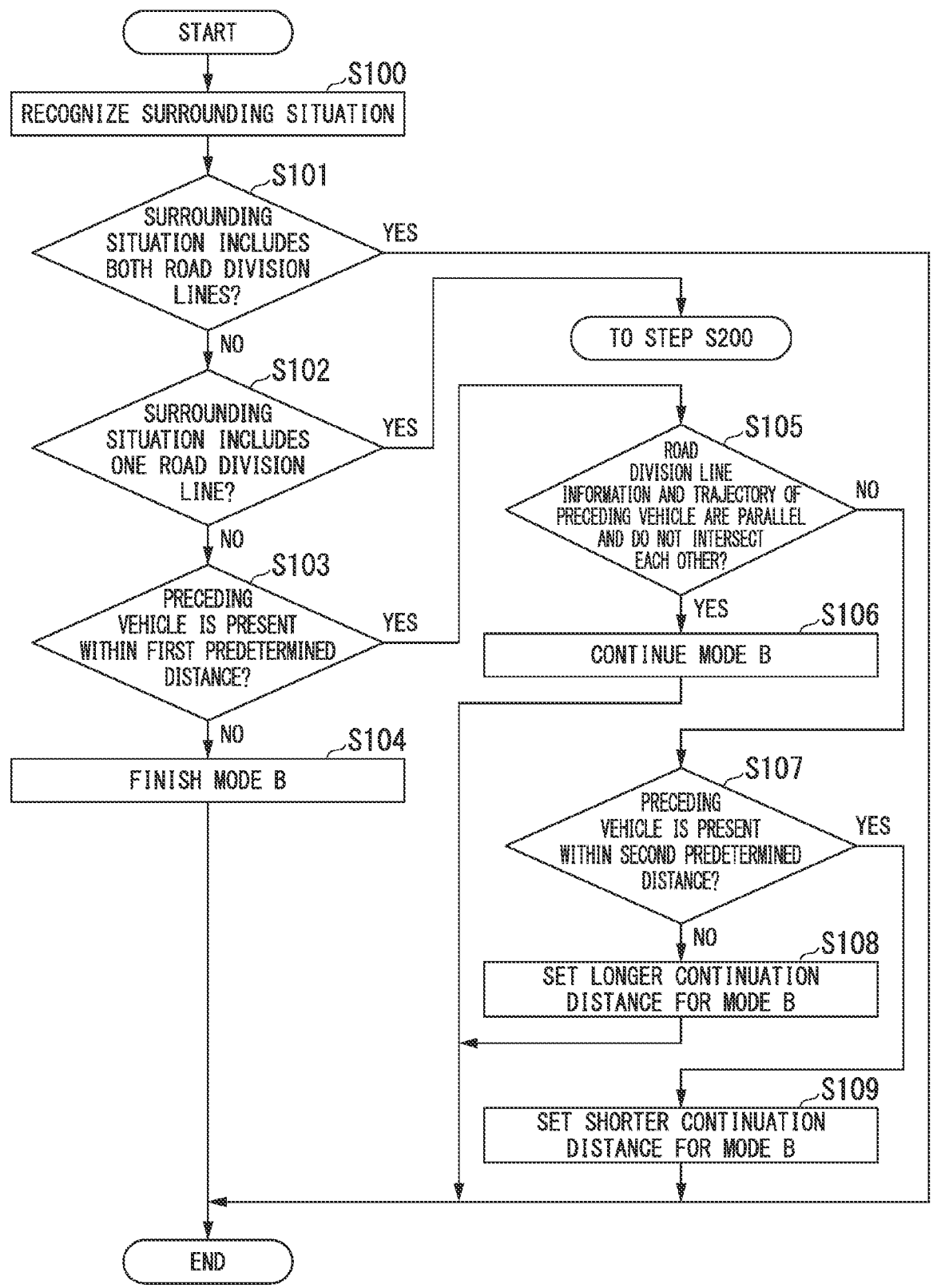
FIG. 6 is a flow chart illustrating an example of a flow of operations to be executed by the vehicle control device according to this embodiment.

Next, description is given of a flow of operations to be executed by the vehicle control device according to this embodiment with reference to FIG. 6 and FIG. 7. FIG. 6 is a flow chart illustrating an example of a flow of operations to be executed by the vehicle control device according to this embodiment. The processing of this flow chart is executed at a predetermined control cycle while the host vehicle M is traveling in the driving mode of the mode B.

First, the recognizer 130 recognizes the surrounding situation of the host vehicle M (Step S100). Next, the determiner 132 determines whether or not the surrounding situation recognized by the recognizer 130 includes both road division lines of the host vehicle M (Step S101). When the surrounding situation recognized by the recognizer 130 is determined to include both road division lines of the host vehicle M, the vehicle control device continues traveling of the host vehicle M in the driving mode of the mode B, and finishes the processing. On the other hand, when the surrounding situation recognized by the recognizer 130 is determined not to include both road division lines of the host vehicle M, the determiner 132 next determines whether or not the surrounding situation recognized by the recognizer 130 includes one road division line of the host vehicle M (Step S102).

When the surrounding situation recognized by the recognizer 130 is determined to include one road division line of the host vehicle M, the vehicle control device advances the processing to Step S200 described later. On the other hand, when the surrounding situation recognized by the recognizer 130 is determined not to include one road division line of the host vehicle M, the determiner 132 next determines whether or not the preceding vehicle mA is present within the first predetermined distance D1 (Step S103). When the preceding vehicle mA is determined not to be present within the first predetermined distance D1, the action plan generator 140 causes the host vehicle M to travel in the driving mode of the mode B for a certain distance, and after that, the mode determiner 150 finishes the driving mode of the mode B (Step S104).

When the preceding vehicle mA is determined to be present within the first predetermined distance D1, the determiner 132 determines whether or not the degree of parallelism between the road division line ML in the second map information 62 and the trajectory TmA of the preceding vehicle mA is equal to or smaller than the threshold value and the road division line ML and the trajectory TmA do not intersect each other (Step S105). When it is determined that the degree of parallelism between the road division line ML in the second map information 62 and the trajectory TmA of the preceding vehicle mA is equal to or smaller than the threshold value and the road division line ML and the trajectory TmA do not intersect each other, the action plan generator 140 continues traveling of the host vehicle M in the driving mode of the mode B using the second map information 62 (Step S106).

When it is determined that the degree of parallelism between the road division line ML in the second map information 62 and the trajectory TmA of the preceding vehicle mA is larger than the threshold value or the road division line ML and the trajectory TmA intersect each other, the determiner 132 next determines whether or not the preceding vehicle mA is present within the second predetermined distance D2 (Step S107). When it is determined that the preceding vehicle mA is present outside of the second predetermined distance D2 from the host vehicle M, the action plan generator 140 sets a longer traveling continuation distance in the driving mode of the mode B using the second map information 62 (Step S108). On the other hand, when it is determined that the preceding vehicle mA is determined to be present within the second predetermined distance D2 from the host vehicle M, the action plan generator 140 sets a shorter traveling continuation distance in the driving mode of the mode B using the second map information 62 (Step S109). Then, the processing of this flow chart is finished.

Next, referring to FIG. 7, description is given of a flow of operations to be executed by the vehicle control device when the surrounding situation recognized by the recognizer 130 includes only one road division line. FIG. 7 is a flow chart illustrating an example of a flow of operations to be executed by the vehicle control device when the surrounding situation recognized by the recognizer 130 includes only one road division line. The processing of this flow chart is executed when determination in Step S102 of FIG. 6 results in Yes.

The determiner 132 determines whether or not a deviation between the road division line ML in the second map information 62 and the one road division line included in the surrounding situation is determined to be equal to or smaller than the threshold value, that is, whether or not the road division line ML in the second map information 62 and the one road division line included in the surrounding situation match each other (Step S200). When the road division line ML in the second map information 62 and the one road division line included in the surrounding situation are determined to match each other, the action plan generator 140 continues traveling of the host vehicle M in the driving mode of the mode B using the second map information 62 (Step S201). On the other hand, when the road division line ML in the second map information 62 and the one road division line included in the surrounding situation are determined not to match each other, the mode determiner 150 finishes the driving mode of the mode B (Step S202). Then, the processing of this flow chart is finished.

According to this embodiment, when the recognizer 130 cannot recognize a road division line, the driving mode is determined based on whether both or one of road division lines cannot be recognized, whether there is the preceding vehicle M, and whether the degree of parallelism between the road division line in the second map information 62 and the trajectory TmA of the preceding vehicle mA. As a result, it is possible to continue assistance for driving a host vehicle by using map information even when a road division line cannot be recognized.

This concludes the description of the embodiment for carrying out the present invention. The present invention is not limited to the embodiment in any manner, and various kinds of modifications and replacements can be made within a range that does not depart from the gist of the present invention.

What is claimed is:

1. A vehicle control device, comprising:
a storage device storing a program; and
a hardware processor executing the program stored in the storage device to:
recognize a surrounding situation of a vehicle;
determine whether or not the surrounding situation includes a road division line;
control steering and acceleration/deceleration of the vehicle based on the recognized surrounding situation and map information without depending on an operation performed by a driver of the vehicle;
determine a driving mode of the vehicle as any one of a plurality of driving modes including a first driving mode and a second driving mode, wherein the second driving mode is a driving mode in which a load of a task imposed on the driver is smaller than a load of a task imposed in the first driving mode, wherein a part of the plurality of driving modes including at least the second driving mode is performed by controlling steering and acceleration/deceleration of the vehicle without depending on an operation performed by the driver of the vehicle, and wherein when a task in the determined driving mode is not performed by the driver, the driving mode of the vehicle is changed to a driving mode imposing a larger task load; and
set, when the vehicle is traveling in the second driving mode, the surrounding situation is determined not to include a road division line, and a preceding vehicle is recognized within a first predetermined distance in a traveling direction of the vehicle, a longer traveling continuation distance in the second driving mode using the map information than when the surrounding situation is determined not to include a road division line and the preceding vehicle is not recognized,
wherein, when the surrounding situation is determined not to include a road division line, the hardware processor determines whether both of the road division lines of the vehicle are not included or only one of the road division lines of the vehicle is not included,
wherein, when both of the road division lines of the vehicle are determined not to be included, the preceding vehicle is recognized within the first predetermined distance in the traveling direction of the vehicle, and a degree of parallelism between a road division line in the map information and a trajectory of the preceding vehicle is equal to or smaller than a threshold value, the hardware processor sets a longer traveling continuation distance in the second driving mode using the map information than when the degree of parallelism is larger than the threshold value,
wherein when one of the road division lines of the vehicle is determined not to be included, a deviation between a road division line in the map information and the other road division line included in the surrounding situation is determined to be equal to or smaller than a threshold value, and the preceding vehicle is recognized within the first predetermined distance in the traveling direction of the vehicle, the hardware processor continues traveling of the vehicle in the second driving mode, and
wherein a smaller value of the degree of parallelism indicates that the road division line in the map information and the trajectory of the preceding vehicle are more parallel to each other.

2. The vehicle control device according to claim 1, wherein the hardware processor compares the map information with the surrounding situation, and determines whether or not the surrounding situation includes a road division line when the map information does not match the surrounding situation.

3. A vehicle control device, comprising:
a storage device storing a program; and
a hardware processor executing the program stored in the storage device to:
recognize a surrounding situation of a vehicle;
determine whether or not the surrounding situation includes a road division line;
control steering and acceleration/deceleration of the vehicle based on the recognized surrounding situation and map information without depending on an operation performed by a driver of the vehicle;
determine a driving mode of the vehicle as any one of a plurality of driving modes including a first driving mode and a second driving mode, wherein the second driving mode is a driving mode in which a load of a task imposed on the driver is smaller than a load of a task imposed in the first driving mode, wherein a part of the plurality of driving modes including at least the second driving mode is performed by controlling steering and acceleration/deceleration of the vehicle without depending on an operation performed by the driver of the vehicle, and wherein when a task in the determined driving mode is not performed by the driver, the driving mode of the vehicle is changed to a driving mode imposing a larger task load; and
set, when the vehicle is traveling in the second driving mode, the surrounding situation is determined not to include a road division line, and a preceding vehicle is recognized within a first predetermined distance in a traveling direction of the vehicle, a longer traveling continuation distance in the second driving mode using the map information than when the surrounding situation is determined not to include a road division line and the preceding vehicle is not recognized,
wherein, when the surrounding situation is determined not to include a road division line, the hardware processor determines whether both of the road division lines of the vehicle are not included or only one of the road division lines of the vehicle is not included,
wherein, when both of the road division lines of the vehicle are determined not to be included, the preceding vehicle is recognized within the first predetermined distance in the traveling direction of the vehicle, and a road division line in the map information and a trajectory of the preceding vehicle do not intersect each other, the hardware processor sets a longer traveling continuation distance in the second driving mode using the map information than when the road division line and the trajectory intersect each other, wherein when one of the road division lines of the vehicle is determined not to be included, a deviation between a road division line in the map information and the other road division line included in the surrounding situation is determined to be equal to or smaller than a threshold value, and the preceding vehicle is recognized within the first predetermined distance in the traveling direction of the vehicle, the hardware processor continues traveling of the vehicle in the second driving mode, and wherein a smaller value of a degree of parallelism indicates that the road division line in the map information and the trajectory of the preceding vehicle are more parallel to each other.

4. The vehicle control device according to claim 1, wherein, when both of the road division lines of the vehicle are determined not to be included, the preceding vehicle is recognized within the first predetermined distance in the traveling direction of the vehicle, the degree of parallelism between a road division line in the map information and the trajectory of the preceding vehicle is equal to or smaller than the threshold value, and the road division line and the trajectory do not intersect each other, the hardware processor sets a longer traveling continuation distance in the second driving mode using the map information than when the degree of parallelism is larger than the threshold value or the road division line and the trajectory intersect each other.

5. The vehicle control device according to claim 1, wherein, when both of the road division lines of the vehicle are determined not to be included, the preceding vehicle is recognized within the first predetermined distance in the traveling direction of the vehicle, the degree of parallelism between a road division line in the map information and the trajectory of the preceding vehicle is equal to or smaller than the threshold value, and the road division line and the trajectory do not intersect each other, the hardware processor continues traveling of the vehicle in the second driving mode using the map information.

6. The vehicle control device according to claim 1, wherein, when both of the road division lines of the vehicle are determined not to be included, the preceding vehicle is recognized within the first predetermined distance in the traveling direction of the vehicle, the degree of parallelism between a road division line in the map information and the trajectory of the preceding vehicle is larger than the threshold value or the road division line and the trajectory intersect each other, and the preceding vehicle is recognized outside of a second predetermined distance in the traveling direction of the vehicle, the hardware processor sets a longer traveling continuation distance in the second driving mode using the map information than when the preceding vehicle is recognized within the second predetermined distance in the traveling direction of the vehicle.

7. The vehicle control device according to claim 1, wherein, when both of the road division lines of the vehicle are determined not to be included, and the preceding vehicle is not recognized within the first predetermined distance in the traveling direction of the vehicle, the hardware processor changes the driving mode from the second driving mode to the first driving mode after causing the vehicle to travel in the second driving mode for a certain distance.

8. The vehicle control device according to claim 1, wherein, when one of the road division lines of the vehicle is determined not to be included, the deviation between a road division line in the map information and the other road division line included in the surrounding situation is determined to be equal to or smaller than a threshold value, and the preceding vehicle is recognized within the first predetermined distance in the traveling direction of the vehicle, the hardware processor continues traveling of the vehicle in the second driving mode.

9. A vehicle control method to be executed by a computer, the vehicle control method comprising:

recognizing a surrounding situation of a vehicle;

determining whether or not the surrounding situation includes a road division line;

controlling steering and acceleration/deceleration of the vehicle based on the recognized surrounding situation and map information without depending on an operation performed by a driver of the vehicle;

determining a driving mode of the vehicle as any one of a plurality of driving modes including a first driving mode and a second driving mode, wherein the second driving mode is a driving mode in which a load of a task imposed on the driver is smaller than a load of a task imposed in the first driving mode, wherein a part of the plurality of driving modes including at least the second driving mode is performed by controlling steering and acceleration/deceleration of the vehicle without depending on an operation performed by the driver of the vehicle, and wherein when a task in the determined driving mode is not performed by the driver, the driving mode of the vehicle is changed to a driving mode imposing a larger task load; and setting, when the vehicle is traveling in the second driving mode, the surrounding situation is determined not to include a road division line, and a preceding vehicle is recognized within a first predetermined distance in a traveling direction of the vehicle, a longer traveling continuation distance in the second driving mode using the map information than when the surrounding situation is determined not to include a road division line, and the preceding vehicle is not recognized, wherein, when the surrounding situation is determined not to include a road division line, the computer determines whether both of the road division lines of the vehicle are not included or only one of the road division lines of the vehicle is not included, wherein, when both of the road division lines of the vehicle are determined not to be included, the preceding vehicle is recognized within the first predetermined distance in the traveling direction of the vehicle, and a degree of parallelism between a road division line in the map information and a trajectory of the preceding vehicle is equal to or smaller than a threshold value, the computer sets a longer traveling continuation distance in the second driving mode using the map information than when the degree of parallelism is larger than the threshold value, wherein when one of the road division lines of the vehicle is determined not to be included, a deviation between a road division line in the map information and the other road division line included in the surrounding situation is determined to be equal to or smaller than a threshold value, and the preceding vehicle is recognized within the first predetermined distance in the traveling direction of the vehicle, the computer continues traveling of the vehicle in the second driving mode, and wherein a smaller value of the degree of parallelism indicates that the road division line in the map information and the trajectory of the preceding vehicle are more parallel to each other.

10. A non-transitory computer-readable storage medium having stored thereon a program for causing a computer to:

recognize a surrounding situation of a vehicle;

determine whether or not the surrounding situation includes a road division line;

control steering and acceleration/deceleration of the vehicle based on the recognized surrounding situation and map information without depending on an operation performed by a driver of the vehicle;

determine a driving mode of the vehicle as any one of a plurality of driving modes including a first driving mode and a second driving mode, wherein the second driving mode is a driving mode in which a load of a task imposed on the driver is smaller than a load of a task imposed in the first driving mode, wherein a part of the plurality of driving modes including at least the second driving mode is performed by controlling steering and acceleration/deceleration of the vehicle without depending on an operation performed by the driver of the vehicle, and wherein when a task in the determined driving mode is not performed by the driver, the driving mode of the vehicle is changed to a driving mode imposing a larger task load; and set, when the vehicle is traveling in the second driving mode, the surrounding situation is determined not to include a road division line, and a preceding vehicle is recognized within a first predetermined distance in a traveling direction of the vehicle, a longer traveling continuation distance in the second driving mode using the map information than when the surrounding situation is determined not to include a road division line, and the preceding vehicle is not recognized, wherein, when the surrounding situation is determined not to include a road division line, the computer determines whether both of the road division lines of the vehicle are not included or only one of the road division lines of the vehicle is not included, wherein, when both of the road division lines of the vehicle are determined not to be included, the preceding vehicle is recognized within the first predetermined distance in the traveling direction of the vehicle, and a degree of parallelism between a road division line in the map information and a trajectory of the preceding vehicle is equal to or smaller than a threshold value, the computer sets a longer traveling continuation distance in the second driving mode using the map information than when the degree of parallelism is larger than the threshold value, wherein when one of the road division lines of the vehicle is determined not to be included, a deviation between a road division line in the map information and the other road division line included in the surrounding situation is determined to be equal to or smaller than a threshold value, and the preceding vehicle is recognized within the first predetermined distance in the traveling direction of the vehicle, the computer continues traveling of the vehicle in the second driving mode, and wherein a smaller value of the degree of parallelism indicates that the road division line in the map information and the trajectory of the preceding vehicle are more parallel to each other.

11. A vehicle control method to be executed by a computer, the vehicle control method comprising:

recognizing a surrounding situation of a vehicle;

determining whether or not the surrounding situation includes a road division line;

controlling steering and acceleration/deceleration of the vehicle based on the recognized surrounding situation and map information without depending on an operation performed by a driver of the vehicle;

determining a driving mode of the vehicle as any one of a plurality of driving modes including a first driving mode and a second driving mode, wherein the second driving mode is a driving mode in which a load of a task imposed on the driver is smaller than a load of a task imposed in the first driving mode, wherein a part of the plurality of driving modes including at least the second driving mode is performed by controlling steering and acceleration/deceleration of the vehicle without depending on an operation performed by the driver of the vehicle, and wherein when a task in the determined driving mode is not performed by the driver, the driving mode of the vehicle is changed to a driving mode imposing a larger task load; and setting, when the vehicle is traveling in the second driving mode, the surrounding situation is determined not to include a road division line, and a preceding vehicle is recognized within a first predetermined distance in a traveling direction of the vehicle, a longer traveling continuation distance in the second driving mode using the map information than when the surrounding situation is determined not to include a road division line, and the preceding vehicle is not recognized, wherein, when the surrounding situation is determined not to include a road division line, the computer determines whether both of the road division lines of the vehicle are not included or only one of the road division lines of the vehicle is not included, wherein, when both of the road division lines of the vehicle are determined not to be included, the preceding vehicle is recognized within the first predetermined distance in the traveling direction of the vehicle, and a road division line in the map information and a trajectory of the preceding vehicle do not intersect each other, the computer sets a longer traveling continuation distance in the second driving mode using the map information than when the road division line and the trajectory intersect each other, wherein when one of the road division lines of the vehicle is determined not to be included, a deviation between a road division line in the map information and the other road division line included in the surrounding situation is determined to be equal to or smaller than a threshold value, and the preceding vehicle is recognized within the first predetermined distance in the traveling direction of the vehicle, the computer continues traveling of the vehicle in the second driving mode, and wherein a smaller value of a degree of parallelism indicates that the road division line in the map information and the trajectory of the preceding vehicle are more parallel to each other.

12. A non-transitory computer-readable storage medium having stored thereon a program for causing a computer to:

recognize a surrounding situation of a vehicle;

determine whether or not the surrounding situation includes a road division line;

control steering and acceleration/deceleration of the vehicle based on the recognized surrounding situation and map information without depending on an operation performed by a driver of the vehicle;

determine a driving mode of the vehicle as any one of a plurality of driving modes including a first driving mode and a second driving mode, wherein the second driving mode is a driving mode in which a load of a task imposed on the driver is smaller than a load of a task imposed in the first driving mode, wherein a part of the plurality of driving modes including at least the second driving mode is performed by controlling steering and acceleration/deceleration of the vehicle without depending on an operation performed by the driver of the vehicle, and wherein when a task in the determined driving mode is not performed by the driver, the driving mode of the vehicle is changed to a driving mode imposing a larger task load; and set, when the vehicle is traveling in the second driving mode, the surrounding situation is determined not to include a road division line, and a preceding vehicle is recognized within a first predetermined distance in a traveling direction of the vehicle, a longer traveling continuation distance in the second driving mode using the map information than when the surrounding situation is determined not to include a road division line, and the preceding vehicle is not recognized, wherein, when the surrounding situation is determined not to include a road division line, the computer determines whether both of the road division lines of the vehicle are not included or only one of the road division lines of the vehicle is not included, wherein, when both of the road division lines of the vehicle are determined not to be included, the preceding vehicle is recognized within the first predetermined distance in the traveling direction of the vehicle, and a road division line in the map information and a trajectory of the preceding vehicle do not intersect each other, the computer sets a longer traveling continuation distance in the second driving mode using the map information than when the road division line and the trajectory intersect each other, wherein when one of the road division lines of the vehicle is determined not to be included, a deviation between a road division line in the map information and the other road division line included in the surrounding situation is determined to be equal to or smaller than a threshold value, and the preceding vehicle is recognized within the first predetermined distance in the traveling direction of the vehicle, the computer continues traveling of the vehicle in the second driving mode, and wherein a smaller value of a degree of parallelism indicates that the road division line in the map information and the trajectory of the preceding vehicle are more parallel to each other.

* * * * *